United States Patent
Hahs et al.

(10) Patent No.: US 12,544,951 B2
(45) Date of Patent: Feb. 10, 2026

(54) MEASURING DEVICE FOR A VIBRATING DEVICE OF A CONCRETE BLOCK PRODUCTION PLANT

(71) Applicant: HESS GROUP GmbH, Burbach-Wahlbach (DE)

(72) Inventors: Ralf Hahs, Bad Marienberg (DE); Sebastian Bergmann, Höchstenbach (DE)

(73) Assignee: HESS GROUP GMBH, Burbach-Wahlbach (DE)

( * ) Notice: Subject to any disclaimer, the term of this patent is extended or adjusted under 35 U.S.C. 154(b) by 207 days.

(21) Appl. No.: 18/235,244

(22) Filed: Aug. 17, 2023

(65) Prior Publication Data
US 2024/0066752 A1  Feb. 29, 2024

(30) Foreign Application Priority Data

Aug. 23, 2022 (DE) ...................... 10 2022 121 337.4

(51) Int. Cl.
| | |
|---|---|
| *B28B 1/08* | (2006.01) |
| *B28B 1/087* | (2006.01) |
| *B28B 17/00* | (2006.01) |
| *G01D 21/02* | (2006.01) |

(52) U.S. Cl.
CPC ........ *B28B 1/0873* (2013.01); *B28B 17/0081* (2013.01); *G01D 21/02* (2013.01)

(58) Field of Classification Search
CPC .... B28B 1/0873; B28B 17/0081; G01D 21/02
See application file for complete search history.

(56) References Cited

U.S. PATENT DOCUMENTS

| | | | |
|---|---|---|---|
| 4,830,597 A | * | 5/1989 | Steier .................... B28B 1/0873 |
| | | | 425/456 |
| 5,766,538 A | | 6/1998 | Kossmann |

(Continued)

FOREIGN PATENT DOCUMENTS

| | | | |
|---|---|---|---|
| CN | 215339154 U | * | 12/2021 |
| DE | 29702402 U1 | | 4/1997 |

(Continued)

*Primary Examiner* — Francis C Gray
(74) *Attorney, Agent, or Firm* — HAYES SOLOWAY P.C.

(57) ABSTRACT

Disclosed is a measurement device for a vibration device of a concrete-block production plant. The vibration device has a vibrating table and impact strips arranged parallel to each other and parallel to the ground with relation to their longitudinal axes. The measurement device comprises at least one measurement unit for distance. The measurement unit is arranged above the vibrating table and the impact strips, wherein the measurement unit can be guided orthogonally to the impact strips and parallel to the ground using a guide unit. During the guiding process, the measurement unit operates at predefined measuring positions and/or positions determined during the guiding process via the impact strips and the vibrating table, using the measurement unit, the vertical distances from the top sides of the impact strips and/or the vibrating table to reference positions, which result from the heights of the measurement unit at the respective measuring positions, can be determined.

12 Claims, 3 Drawing Sheets

(56) References Cited

U.S. PATENT DOCUMENTS

| | | | |
|---|---|---|---|
| 7,179,077 B2 * | 2/2007 | Chennells | B28B 7/183 |
| | | | 425/432 |
| 2015/0314475 A1 * | 11/2015 | Banus | B30B 15/024 |
| | | | 425/405.1 |
| 2023/0264386 A1 | 8/2023 | Hahs et al. | |

FOREIGN PATENT DOCUMENTS

| | | | | |
|---|---|---|---|---|
| DE | 102016004024 | | 4/2016 | |
| DE | 102016002525 A1 * | | 9/2017 | B06B 1/14 |
| EP | 0343033 A1 | | 11/1989 | |
| EP | 4059682 A1 | | 9/2022 | |
| EP | 4306284 A1 | | 1/2024 | |
| WO | WO-2004009308 A2 * | | 1/2004 | B28B 7/0023 |
| WO | WO-2007065556 A1 * | | 6/2007 | B28B 3/022 |

\* cited by examiner

MEASURING DEVICE FOR A VIBRATING DEVICE OF A CONCRETE BLOCK PRODUCTION PLANT

BACKGROUND OF THE INVENTION

The present invention relates to a measurement device for vibration devices of concrete-production plants or concrete-production machines.

Vibration devices are known from prior art and are used to improve quality by compacting various concrete-production products, such as concrete slabs or concrete blocks for example, during the manufacturing process. Such vibration devices usually comprise a dynamically moveable vibrating table. As a counterpart to the vibrating table, impact strips are rigidly installed on the machine frame of the vibration device. On the vibrating table, a production underlay on which the concrete-production product to be compacted is located in a mould is elastically braced. During the compaction process, the vibrating table moves upwards and downwards together with the production underlay. In its downward movement, the production underlay hits the impact strips. When the vibrating table moves upwards, it hits the production underlay from below. During the compaction process, the vibrating table and the impact strips are exposed to mechanical-wear processes, in particular, abrasive wear or surface breakdown. For this reason, the vibrating table and the impact strips on the top side are typically equipped with replaceable wear strips. The wear strips of the vibrating table and the impact strips are aligned parallel to each other. If the vibrating table and the impact strips comprise wear strips, these are to be regarded as part of the vibrating table or impact strips so that the top sides of the wear strips are then to be understood as the top sides of the vibrating table or impact strips.

Such vibration devices have the disadvantage that the impact strips have to be checked and readjusted at regular intervals. The purpose of testing and readjustment is to reduce the wear of the impact strips and the vibrating table, in particular, the wear of their wear strips, by adjusting the height. The aim is to achieve a consistent quality of the concrete-production products. If the strips are not adjusted correctly, this can also accelerate the wear of the wear strips.

The inspection and readjustment of the strips takes up to 3 hours and is accompanied by partially the dismantling of individual components of the vibration device and/or the concrete-block production plant. The inspection process is risky and very time-consuming due to working in the plant, as a fully equipped concrete-block production plant hardly provides the machine operator any space to work. Therefore, during the testing and readjustment of the impact strips, the entire concrete-block production plant is brought to a standstill.

From prior art, methods for testing the strips are known, in which a flat ruler is placed transversely over the vibrating table and the vertical distance between the top sides of the vibrating table, in particular, its wear strips, and the top sides of the impact strips is determined manually using a caliper. According to the determined distances, the impact strips are readjusted.

Further methods for testing the strips are known from prior art, wherein the measurements of the vertical distances are carried out by means of automated sensor devices. For example, the sensor devices can be based on an acoustic operating principle. For this purpose, the sensor devices are still placed manually on the vibrating table.

Therefore, the object of the invention is to provide a measurement device for a vibration device which makes it possible to determine an top side wear of the strips.

SUMMARY OF THE INVENTION

According to the invention, this problem is solved by means of the object of the independent patent claims. The object of the subclaims entail favourable embodiments and further embodiments.

The measurement device according to the invention is intended for a vibration device of a concrete-block production plant. Essentially, the vibration device comprises impact strips arranged parallel to each other and parallel to the ground with relation to its longitudinal axes. The vibrating table is designed in such a way that its wear strips are aligned parallel to the impact strips or their wear strips with relation to their longitudinal axes and are arranged alternately between the impact strips. Preferably, the measurement device comprises at least one fastening unit. The measurement device comprises at least one measurement unit for distance measurement, wherein the measurement unit is located above the vibrating table and the impact strips. The measurement unit can be guided orthogonally to the impact strips and parallel to the ground by means of a guide unit of the measurement device. Preferably, the measurement unit can be guided in a self-supporting manner above the vibrating table and the impact strips, and the measurement unit is spaced away from the vibrating table and the impact strips in such a way that the distances from the measurement unit to the top sides of the vibrating table or impact strips can be measured at specific measuring positions. According to the invention, during the guiding process, the measurement unit can be approached in succession at predefined measuring positions and/or at measuring positions determined during the guiding process via the impact strips and the vibrating table. It is also conceivable that the measuring positions can be determined by a system operator. By means of the measurement unit, the vertical distances from the top sides of the impact strips and/or the top sides of the vibrating table to reference positions, which result from the heights of the measurement unit at the respective measuring positions, can be determined.

The guiding process of the measurement unit as well as the distance measurement of such measurement devices can be carried out automatically. The distances determined can be compared with each other in such a way that it is possible to compare the heights of the top sides of the strips. In this way, the risky work of a machine operator at the system is eliminated for the testing process of the impact strips. This also partially or completely eliminates the need to dismantle individual components of the vibration device and/or the concrete-block production plant in such a way that the effort and duration of the test are reduced to a minimum. The concrete-block production plant does not have to be completely moved into a standstill to test the strips so that a test between two compaction processes can be economical if, for example, an incorrect alignment of the strip top sides caused by wear can be detected at an early stage, thereby being able to initiate readjustment. In this way, the wear of the impact strips and the vibrating table, particularly their wear strips, can be significantly reduced, which in turn leads to a constant level of product quality. Thereby, the inspection of the strips of such vibration devices is fully automatic and error-free, as human operating errors can be excluded to the furthest extent possible. All in all, such a measurement device is particularly favourable in terms of cost savings, since not only does the concrete-block production plant wear less overall, but the probability of producing rejects can also be reduced many times over.

In a preferred embodiment, the measurement unit comprises a fastening element for attaching the measurement unit to a guide element of the guide unit. Via this fastening element, the measurement unit is attached to the guide element, in particular, to a fastening element of the guide element. Furthermore, the measurement unit comprises a sensor device on the bottom side for distance measurement, wherein the distance from the reference position, which results from the height of the measurement unit at the respective measuring positions, to a surface of an object below the measurement device, preferably to a vertically below the measurement device, can be determined. Preferably, the surface of the object is the top side of an impact strip or the vibrating table or their wear strips. In addition, an interface for energy and data transmission is provided on a side wall or the top side of the measurement unit.

With such a measurement device, the measurement unit can comprise evaluation electronics so that both raw data as well as processed data can be transmitted via the interface.

In another preferred embodiment, which may also be combined with the previously mentioned embodiment, the measurement device is mounted on the ground to the side of the vibrating table device. The measurement unit can be guided linearly from a position, preferably from a park position, which is outside the vibration device, to measuring positions which are within the vibration device and above the vibrating table and the impact strips by means of a guide element of a guide unit of the measurement device. Preferably, the guide unit is also intended and provided to return the measurement unit to the initial position, in particular, to the park position outside the vibration device, after the measurement process. It is favourable that the measurement unit can be moved horizontally at a constant height during the guiding process, wherein the measurement unit is vertically spaced away from the impact strips and the vibrating table during the guiding process. The dimensions of the measurement unit and the dimensions of the guide element, as well as the path along which the measurement unit can be guided, are designed in such a way that: the measurement unit can be guided from the park position outside the vibration device to the measuring positions located inside the vibration device, wherein the dismantling of individual components of the vibration device and/or the concrete-block production plant is not necessary or is reduced to a minimum.

Preferably, the guide unit essentially comprises a guide element, a drive unit and a gearbox. The guide element is a push chain, a rack or a comparable construction element, which can be used for horizontal, linear guiding of the measurement unit. The guide element can be moved into a horizontal movement via the gearbox by means of the drive unit. The drive unit can be an electric motor, preferably a servo motor with an encoder for position determination. The gearbox can be connected to the drive unit via a clutch shaft and a drive unit to convert the rotational movement of the drive unit into a longitudinal movement of the guide element.

When using a push chain as a guide element, it can be wound and unwound on a drum so that the push chain can be stowed away in a space-saving manner. To do this, the drum preferably has an oblong shape, wherein the longitudinal axis of the drum is aligned orthogonally to the ground. The drum can comprise a housing that can be used to protect the push chain.

In such a measurement device, the fastening unit of the measurement device is anchored to the ground outside the vibration device, preferably anchored using dowels. The fastening unit has at least one base plate and one vibration damper, which are anchored to the ground. Such vibration dampers can be, for example, in the form of rubber mats, which can reduce the transmission of oscillations and vibrations from the ground to the measurement unit. In such an embodiment, the guide unit is attached to the fastening unit in such a way that the guide unit is also outside the vibration device. Only the guide element, including the measurement unit, is fed into the vibration device during the guiding process.

If the measurement unit is in the park position, the functionality of the vibration device is ensured.

It is conceivable that the measurement unit can be calibrated in the park position.

In another embodiment, which may also be combined with the previously mentioned embodiments, the measurement device comprises at least two measurement units spaced along the longitudinal axes of the impact strips. Each measurement unit can be guided horizontally by means of a separate guide element.

The feature that the measurement device comprises at least two measurement units spaced away along the longitudinal axes of the impact strips makes it possible to detect any misalignment of the top sides of the impact strips or the vibrating table in the direction of the longitudinal axes of the impact strips. This misalignment can be caused by adjusted impact strips and/or by uneven wear of the impact strips or the vibrating table.

It is conceivable that the guide elements and thus the measurement units can be set in motion independently of each other or simultaneously by means of the guide unit.

In a further embodiment, which may also be combined with the previously mentioned embodiments, the measurement unit comprises two sensor devices for distance measurement, wherein the sensor devices are offset from each other in one direction orthogonal to the longitudinal axes of the impact strips. As a result, any misalignment of the top sides of the strips in one direction orthogonal to the longitudinal axes of the impact strips can be detected. This misalignment can be caused by adjusted impact strips and/or by uneven wear of the impact strips or the vibrating table.

In accordance with one embodiment, the sensor device of the measurement unit is based on an optical, acoustic, inductive, capacitive or other operating principle suitable for distance measurement.

The sensor device essentially comprises a transmitter, a receiver, electronics for signal processing and an interface for data and energy transmission. The type of these components depends on the operating principle of the sensor device.

In a further embodiment, which may also be combined with the previously mentioned embodiments, the measurement device has a hydraulic, pneumatic or electric lifting unit for lifting and lowering the measurement unit. In this embodiment, the guide unit is no longer directly attached to the fastening unit. Rather, the guide unit is attached to the lifting unit, wherein, in turn, the lifting unit is attached to the fastening unit. With the lifting unit, vertical movement of the guide unit is possible. Via this vertical movement of the guide unit, the measurement unit can be moved vertically indirectly by means of the lifting unit.

Preferably, the lifting unit has a drive unit, preferably a motor. The rotational movement of the drive unit can be converted into an upward and downward movement of the guide unit via a coupling and a jackscrew. A lifting column is conceivable for guiding the lifting movement.

It is also conceivable that, in a further embodiment of the aforementioned embodiment, the measurement unit is reduced during the distance measurement on the top side of the vibrating table and in particular on the top sides of two wear strips of the vibrating table. The reference position results from the height of the measurement unit resting on the top sides of the vibrating table. The vertical distance between the reference position and the top side of the impact strip between the vibrating table or between the two wear strips of the vibrating table can thus be determined.

In one embodiment of the aforementioned embodiment, it is also conceivable that the measurement unit is fastened in the state resting on the vibrating table by means of at least one externally controllable fastening means. In particular, the fastening means is an electric holding magnet. The measurement unit is attached to at least one of the two wear strips of the vibrating table on which the measurement unit rests.

It is also conceivable that the measurement unit is attached to two wear strips of the vibrating table by means of two fastening means, in particular by means of two electric holding magnets. In each case, a fastening means is provided and determined for attachment to a wear strip.

The fastening means, in particular electric holding magnets, are activated during the measuring process and deactivated during the lifting and guiding process of the measurement unit. By attaching the measurement unit to the vibrating table by means of the fastening means, a reliable and interference-free determination of the distances from the top sides of the impact strips to the reference planes, which result from the heights of the measurement unit resting on the top sides of the vibrating table, can be carried out.

The present invention also relates to a method for determining the vertical distance between the top sides of the vibrating table and the top sides of the impact strips by means of a measurement device for a vibration device, in particular, for a vibration device of a concrete-production plant. Such a vibration device has impact strips arranged parallel to each other with relation to its longitudinal axes. The longitudinal axes of the impact strips and the top side of the vibrating table are aligned parallel with relation to the ground. The measurement device has at least one measurement unit for determining the vertical distances from the top sides of the impact strips and/or the vibrating table to reference positions, which result from the heights of the measurement unit at the respective measuring positions. The method for determining the vertical distance includes the following steps:

a. guiding the measurement unit above the vibrating table and the impact strips to a predefined measuring position or to a measuring position determined during guidance.

b. measuring the distances from the reference position, which results from the height of the measurement unit to the top side of the impact strip or to the top side of the vibrating table at the measuring position.

c. comparing the distance of an impact strip to the reference position with the distances of the wear strips of the vibrating table adjacent to the impact strip to the reference position.

d. guiding the measurement unit to a subsequent measuring position and repeating steps b to c until all measuring positions have been approached.

e. guiding the measurement unit to the park position.

In a further embodiment of the method, it is conceivable that the measurement unit for determining the vertical distances can be lowered to the surface of the vibrating table and, in particular, to the surfaces of two wear strips of the vibrating table, wherein the reference positions are the heights of the measurement unit lowered to the surfaces of the vibrating table, and the vertical distances between the top sides of the impact strips located between the vibrating table, in particular, between the two wear strips of the vibrating table, and the reference positions can be determined.

In a further embodiment of the method, it is conceivable that steps a-e are executed in a different order.

Further advantages and embodiments of the invention result from the accompanying figures and the description of these figures.

BRIEF DESCRIPTION OF THE DRAWINGS

The figures show.

DETAILED DESCRIPTION OF THE INVENTION

Figure 1:
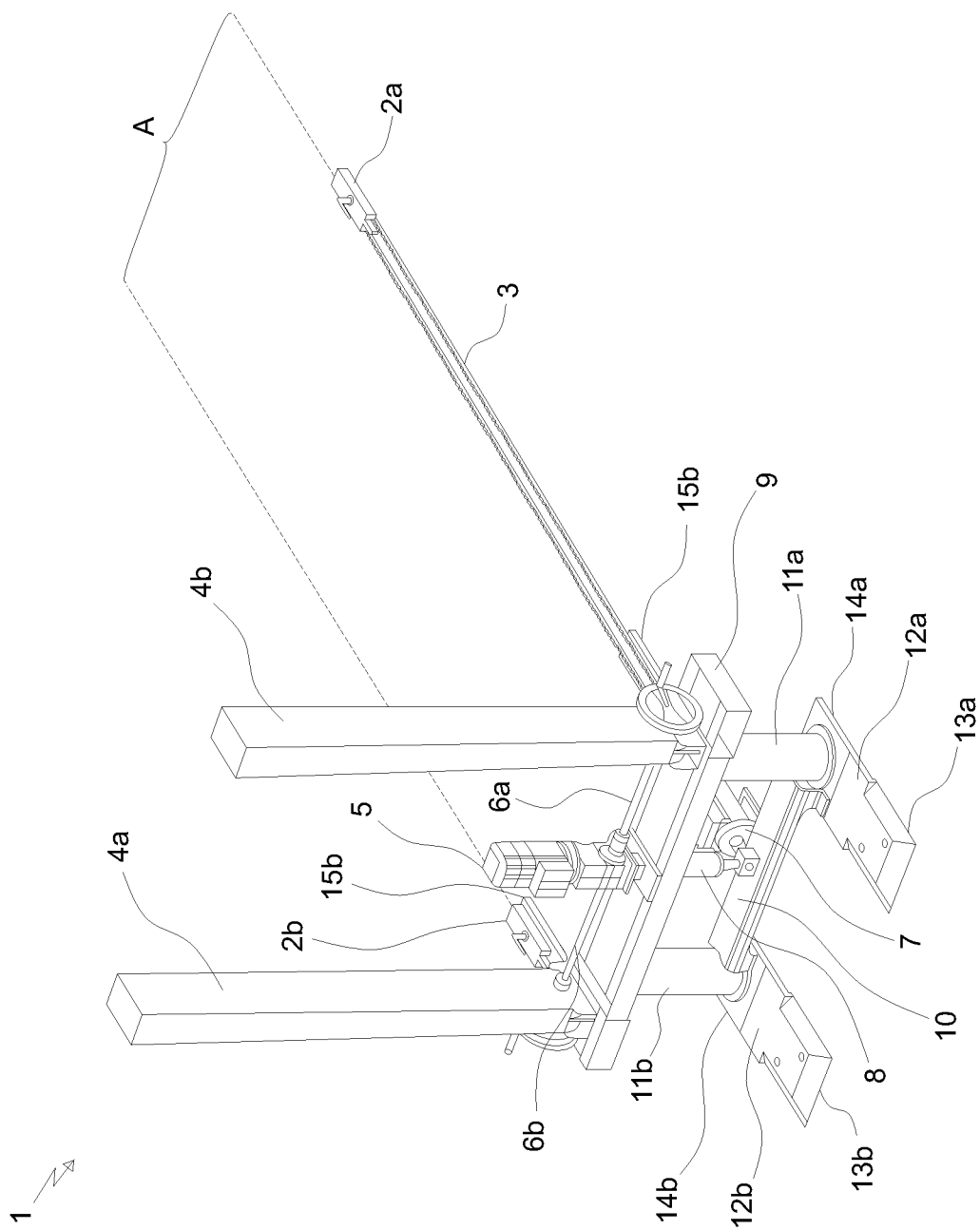
FIG. 1 a perspective illustration of a measurement device in accordance with an embodiment
FIG. 2 a perspective illustration of a measurement device arranged on a vibration device in accordance with an embodiment
FIG. 3 a lateral illustration of a measurement device on the vibrating table in accordance with an embodiment

FIG. 1 shows an embodiment of a measurement device (1). In this embodiment, the measurement device (1) comprises two fastening units (12a, 12b), a lifting unit, two measurement units (2a, 2b) and a guide unit for guiding the two measurement units horizontally (2a, 2b).

The fastening units (12a, 12b) each comprise a base plate (14a, 14b) and a vibration damper (13a, 13b). The fastening units (12a, 12b) are anchored, preferably bolted, to the ground by means of base plates (14a, 14b) and vibration dampers (13a, 13b) in such a way that the transmission of oscillations and vibrations from the ground to the measurement device is reduced. Typically, the vibration dampers (13a, 13b) are rubber plates, wherein their edges can be flattened, as shown.

In this embodiment, the lifting unit comprises a drive unit (7), a vertical jackscrew (8), two vertical lifting columns (11a, 11b), a horizontal upper beam (9) and a horizontal lower beam (10). The lifting unit is attached to the base plates (14a, 14b). The lifting columns (11a, 11b) are spaced apart and each attached to a fastening unit (12a, 12b). The lower beam (10) is attached to both fastening units (12a, 12b) between the lifting columns (11a, 11b). The upper beam (9) extends over the two lifting columns (11a, 11b) and is connected to them. The height of the beam (9) can be adjusted. For this purpose, the beam (9) is driven by the drive unit (7) via the jackscrew (8) and guided by the lifting columns (11a, 11b). The jackscrew is mounted between the upper beam (9) and the lower beam (10).

The guide unit is attached on the top side of the upper beam (9). The guide unit shown is intended for the horizontal guidance of two measurement units (2a, 2b), wherein the two measurement units (2a, 2b) are spaced away by a distance (A) and can be guided parallel to each other. The guide unit comprises a drive unit (5), two clutch shafts (6a, 6b), two guide elements (wherein only one guide element (3) is shown), two drums (4a, 4b) and two stations (15a, 15b). The guide elements, drums (4a, 4b) and stations (15a, 15b), are spaced apart according to the distance (A). In this embodiment, the guide elements are push chains, which are orthogonal to the beams (9, 10) and can be moved horizontally. The guide element (3) is shown in an at least partially extended state. The other guide element (not shown here) is in a fully retracted state and thus completely wound onto the drum (4b). In this embodiment, the drums (4a, 4b) have an oblong shape, wherein the longitudinal axis is aligned orthogonally to the ground in such a way that the guide elements can be stowed away in a space-saving manner. When wound, the guide elements are protected from external influences by the drums (4a, 4b).

The measurement units (2a, 2b) are attached to the guide elements, wherein only the guide element (3), to which the measurement unit (2a) is attached, is shown here. The measuring element (2a) is guided through the guide device to a measuring position. The measuring element (2b) is located at the station (15b) in a park position.

Figure 2:
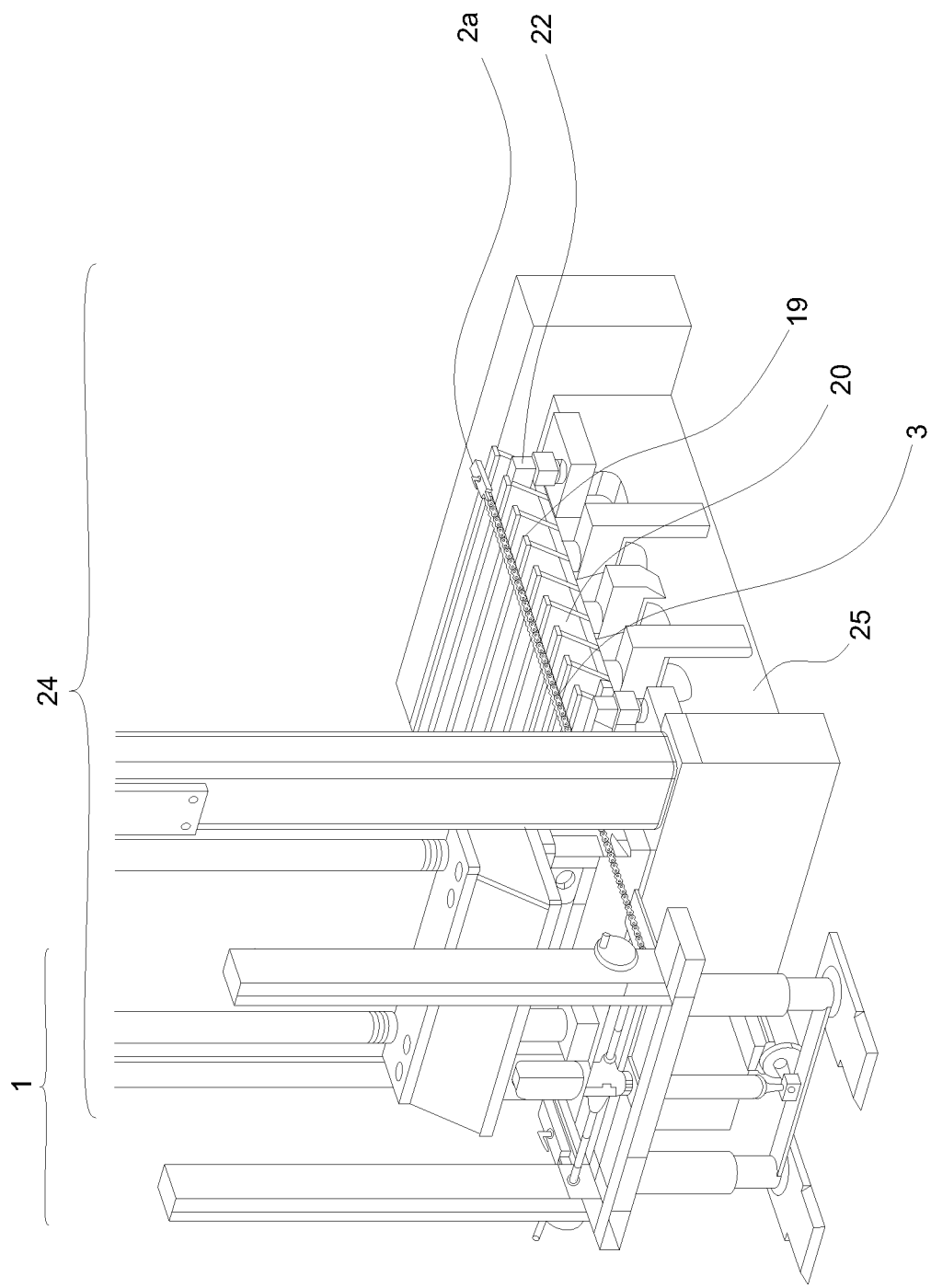

FIG. 2 shows a measurement device (1) in accordance with FIG. 1 and a vibration device (24). The vibration device shown (24) comprises a vibrating table (20) with wear strips (19) bolted to it and an impact strip (22) rigidly bolted to a machine frame (25) of the concrete-production plant.

Typically, a vibration device of the same type comprises a total of five impact strips including wear strips and ten wear strips of the vibrating table, wherein the number of strips can vary in other embodiments of vibration devices. The wear strips of the vibrating table and the impact strips are aligned parallel to each other and horizontally, wherein each impact strip is arranged between two wear strips of the vibrating table. FIG. 2 shows only one impact strip (22).

The measurement device (1) is attached to the ground next to the vibration device (24) in such a way that the measurement units (2a, 2b) can be guided laterally into the vibration device (24) and orthogonally to the impact strips (22) by means of the guide unit. For this purpose, the measurement devices (2a, 2b) can be guided horizontally and above the impact strips and the vibrating table. The guide device (1) is designed in such a way that the measurement units can be approached with it to all impact strips to be adjusted. The measurement device (1) is designed in such a way that the measurement units can be set down or lifted off again on the top side of the vibrating table at all measuring positions by means of lifting movements. If both measurement units (2a, 2b) are in the park position, the compaction process can be carried out.

Figure 3:
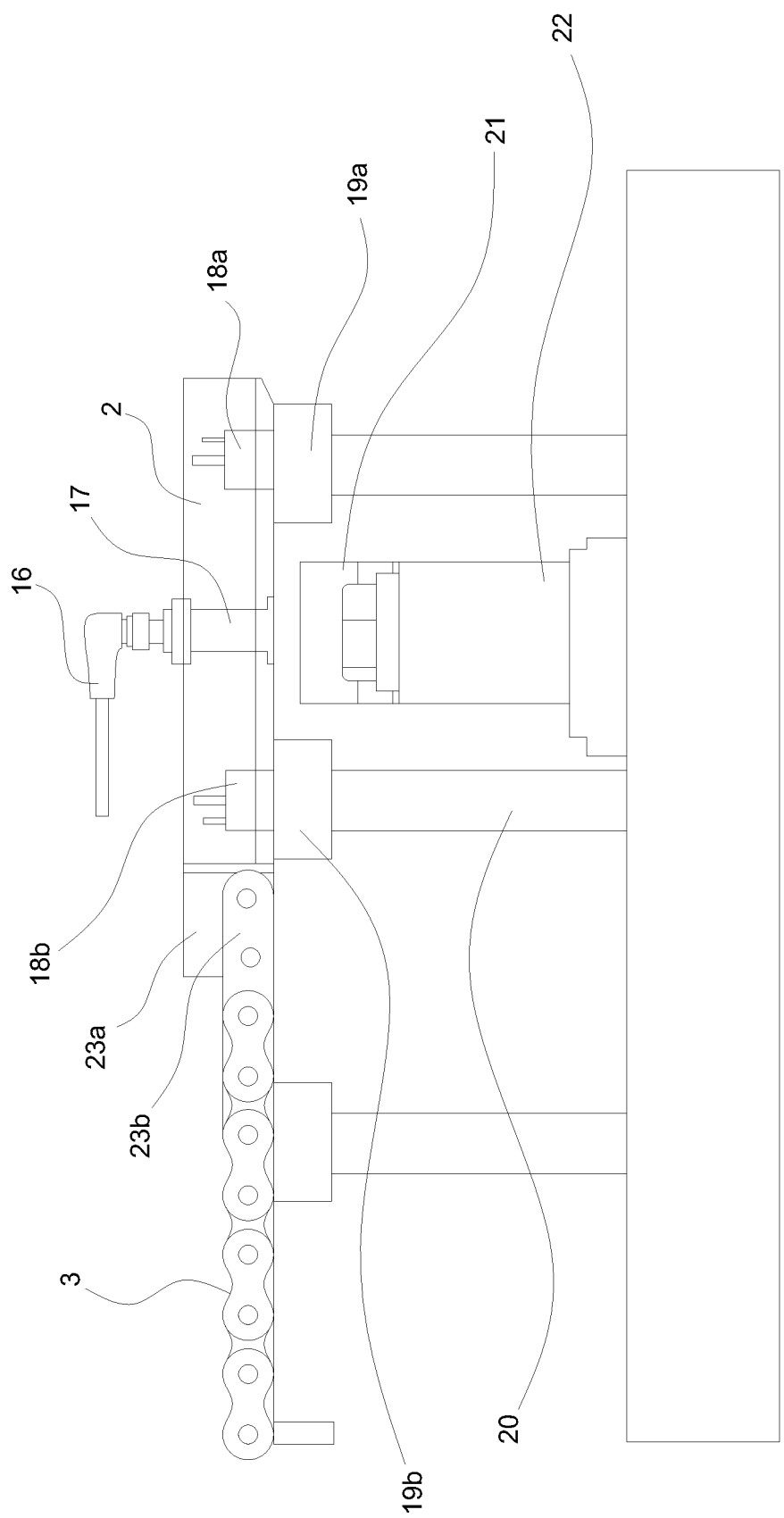

FIG. 3 shows in a lateral view an embodiment in which a measurement unit (2) is attached to the top sides of the wear strips (19a, 19b) of the vibrating table. An impact strip (22) is arranged between the two wear strips (19a, 19b), which has a wear strip (21) on the top side. The measurement unit (2) is guided to the measuring position by means of the guide unit (wherein only the guide element (3) is shown here) and is reduced to the top sides of the wear strips (19a, 19b) by means of a lifting movement realized by means of the lifting unit (not shown here).

In this positioning of the measurement unit (2), a sensor device (17) located on the bottom side of the measurement unit (2) is located vertically above the top side of the wear strip (21) of the impact strip (22). The sensor device (17) is aligned in such a way that a distance from a reference plane, which results from the height of the measurement device (2), to an object located below the measurement device (2) can be determined. In this case, the object is the wear strip (21) of the impact strip (22) and the height of the measurement device (2) results from the fact that the measurement device (2) rests on the two top sides of the wear strips (19a, 19b). Thus, in this embodiment, the vertical distance from the top side of the wear strip (21) of the impact strip (22) to the top sides of the wear strips (19a, 19b) can be determined.

The measurement unit (2) has an interface (16) for transmitting the data determined by means of the sensor device.

The measurement unit (2) shown also comprises a fastening element (23a) by means of which the measurement unit (2) is attached to the fastening element (23b) of the guide element (3).

The measurement unit (2) shown comprises two fastening means (18a, 18b) by means of which the measurement unit (2) is attached to the top sides of the wear strips (19a, 19b). The fastening means (18a, 18b) are typically electric holding magnets.

REFERENCE LIST 1 measurement device
2a measurement unit at one measuring position
2b measurement unit at a park position
3 guide element
4a/b drum
5 drive unit of the guide unit
6a/b clutch shaft
7 drive unit of the lifting unit
8 jackscrew
9 upper beam
10 lower beam
11a/b lifting column
12a/b fastening unit
13a/b vibration damper
14a/b base plate
15a/b station
16 interface
17 sensor device
18a/b fastening means
19, 19a/b wear strips of the vibrating table
20 vibrating table
21 wear strip of an impact strip
22 impact strip
23a fastening element of the measurement unit
23b fastening element of the guide element
24 vibration device
25 machine frame

The invention claimed is:

1. A measurement device for a vibration device of a concrete-block production plant, wherein the vibration device comprises a vibrating table and impact strips alternately arranged parallel to each other and parallel to the ground with relation to their longitudinal axes, and the measurement device comprises at least one measurement unit for distance measurement, wherein the measurement unit is arranged above the vibrating table and the impact strips, and the measurement unit is configured to be guided orthogonally to the impact strips and parallel to the ground using a guide unit of the measurement device wherein,
during a guiding process, the measurement unit is approached in succession to predefined measuring positions and/or to measuring positions determined during the guiding process via the impact strips and the vibrating table, and the measurement unit, the vertical distances from the top sides of the impact strips and/or the top side of the vibrating table at the measuring position to the reference positions, which result from the heights of the measurement unit at the respective measuring positions, can be determined.

2. A measurement device according to claim 1, wherein the measurement unit
a) comprises a fastening element for attaching the measurement unit to a guide element of the guide unit;
b) comprises a sensor device for distance measurement on the bottom side, wherein the distance from a reference position, which results from the height of the measurement unit at the respective measuring positions, to a surface of an object below the measurement device can be determined,
c) comprises an interface on a side wall or the top side for energy and data transmission.

3. The measurement device according to claim 1, wherein the measurement device is mounted on the ground to the side of the vibration device, and the measurement unit can be guided linearly from a park position outside the vibration device to measuring positions located inside the vibration device and above the vibrating table and the impact strips using a guide element of the guide unit of the measurement device.

4. The measurement device according to claim 1, wherein the measurement device comprises at least two measurement units spaced away along the longitudinal axes of the impact strips, wherein each measurement unit can be horizontally guided using a separate guide element of the guide unit.

5. The measurement device according to claim 1, wherein the measurement unit comprises two sensor devices for distance measurement, wherein the sensor devices are offset from each other in one direction orthogonally to the longitudinal axes of the impact strips.

6. The measurement device according to claim 2, wherein the sensor device of the measurement unit is based on an optical, acoustic, inductive, capacitive or other operating principle suitable for distance measurement.

7. The measurement device according to claim 1, wherein the measurement device comprises a hydraulic, pneumatic or electric lifting unit for lifting and lowering the measurement unit.

8. The measurement device according to claim 7, wherein the measurement unit is reduced during the distance measurement on the top side of the vibrating table, wherein the reference position results from the height of the measurement unit resting on the top side of the vibrating table, and the vertical distance between the reference position and the top side of the impact strip located between the vibrating table can be determined.

9. The measurement device according to claim 8, wherein the measurement unit, when resting on the vibrating table, is attached to the vibrating table using at least one externally controllable fastener namely, an electric holding magnet.

10. A method for determining the vertical distance between the vibrating table and the impact strips of a vibration device of a concrete-block production plant using a measurement device according to claim 1, comprising the steps:
a. guiding the measurement unit above the vibrating table and the impact strips to a predefined measuring position or to a measuring position determined during guidance;
b. measuring the distances from the reference position, which results from the height of the measurement unit to the top side of the impact strip at the measuring position or to the top side of the vibrating table at the measuring position;
c. comparing the distance of an impact strip to the reference position with the distances of the vibrating table adjacent to the impact strip to the reference position;
d. guiding the measurement unit to a subsequent measuring position and repeating steps b to c until all measuring positions have been approached;
e. guiding the measurement unit to a park position outside the vibration device.

11. The method according to claim 10,
wherein
the measurement unit for determining the height can be lowered to the surfaces of the vibrating table, wherein the reference positions are the heights of the measurement unit lowered to the surfaces of the vibrating table, and the vertical distances between the top sides of the impact strips located between the vibrating table and the reference positions can be determined.

12. The measurement device according to claim 5, wherein
the sensor device of the measurement unit is based on an optical, acoustic, inductive, capacitive or other operating principle suitable for distance measurement.

* * * * *